(12) United States Patent
Pontone et al.

(10) Patent No.: US 12,552,119 B2
(45) Date of Patent: Feb. 17, 2026

(54) METHOD AND SYSTEM FOR APPLYING A SEALING AGENT TO THE SURFACE OF AN INTERNAL CAVITY OF A PNEUMATIC TIRE

(71) Applicant: Bridgestone Europe NV/SA [BE/BE], Zaventem (BE)

(72) Inventors: Roberto Pontone, Rome (IT); Paolo Staffi, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 436 days.

(21) Appl. No.: 17/920,436

(22) PCT Filed: May 5, 2021

(86) PCT No.: PCT/EP2021/061817
§ 371 (c)(1),
(2) Date: Oct. 21, 2022

(87) PCT Pub. No.: WO2021/224314
PCT Pub. Date: Nov. 11, 2021

(65) Prior Publication Data
US 2023/0173776 A1    Jun. 8, 2023

(30) Foreign Application Priority Data

May 5, 2020    (IT) .................. 102020000009841

(51) Int. Cl.
*B29D 30/06* (2006.01)
*B29C 73/16* (2006.01)

(52) U.S. Cl.
CPC ........ *B29D 30/0685* (2013.01); *B29C 73/166* (2013.01); *B29D 2030/0694* (2013.01); *B29D 2030/0697* (2013.01)

(58) Field of Classification Search
CPC ......... B29D 30/0685; B29D 2030/0686–0698; B29C 73/166
See application file for complete search history.

(56) References Cited

U.S. PATENT DOCUMENTS 4,433,011 A    2/1984  Larson et al.
4,974,752 A *  12/1990 Sirek ................ B05C 17/00533
                                                       222/391
(Continued)

FOREIGN PATENT DOCUMENTS

CN    2057965 U  *  6/1990  ............. F04B 33/02
EP     304904 A2    3/1989
(Continued)

OTHER PUBLICATIONS

International Searching Authority: International Search Report for corresponding PCT/EP2021/061817 dated Jul. 28, 2021, 5 pages.

*Primary Examiner* — Katelyn W Smith
*Assistant Examiner* — Philip N Schwartz
(74) *Attorney, Agent, or Firm* — Patterson Intellectual Property Law, PC

(57) ABSTRACT

A method and a system for applying a sealing agent to the inner surface (2) of a pneumatic tire (4) comprising a supply circuit (10) having a sealing agent collection device (11) comprising a tank (14); a sealing agent heating device (12); and a sealing agent supply device (13) implemented by means of a pumping device (17) that supplies the sealing agent to an applicator device (7), a piston (26), an extractor element (28) intended to withdraw the sealing agent and to supply it to the pumping device (17); a piston (26) position control device (30); and a level sensor (29) for detecting the quantity of sealing agent within the tank (14); wherein the passage of the control device (30) at the position of the level sensor (29) determines the beginning of depletion position of the tank (14) and a completely empty position of the tank (Continued)

(14) as a function whereof the extractor element (28) and heating element (12) are actuated.

10 Claims, 2 Drawing Sheets

(56) References Cited

U.S. PATENT DOCUMENTS

| | | | |
|---|---|---|---|
| 2016/0067423 A1* | 3/2016 | Goodman | A61M 5/3202 604/82 |
| 2019/0061295 A1* | 2/2019 | Ooshima | B29C 73/166 |
| 2019/0168470 A1* | 6/2019 | Paasch | B60S 5/046 |

FOREIGN PATENT DOCUMENTS

| | | |
|---|---|---|
| EP | 3085523 A1 | 10/2016 |
| EP | 3415303 A1 | 12/2018 |
| EP | 3587141 A1 | 1/2020 |
| WO | 2019123275 A1 | 6/2019 |

* cited by examiner

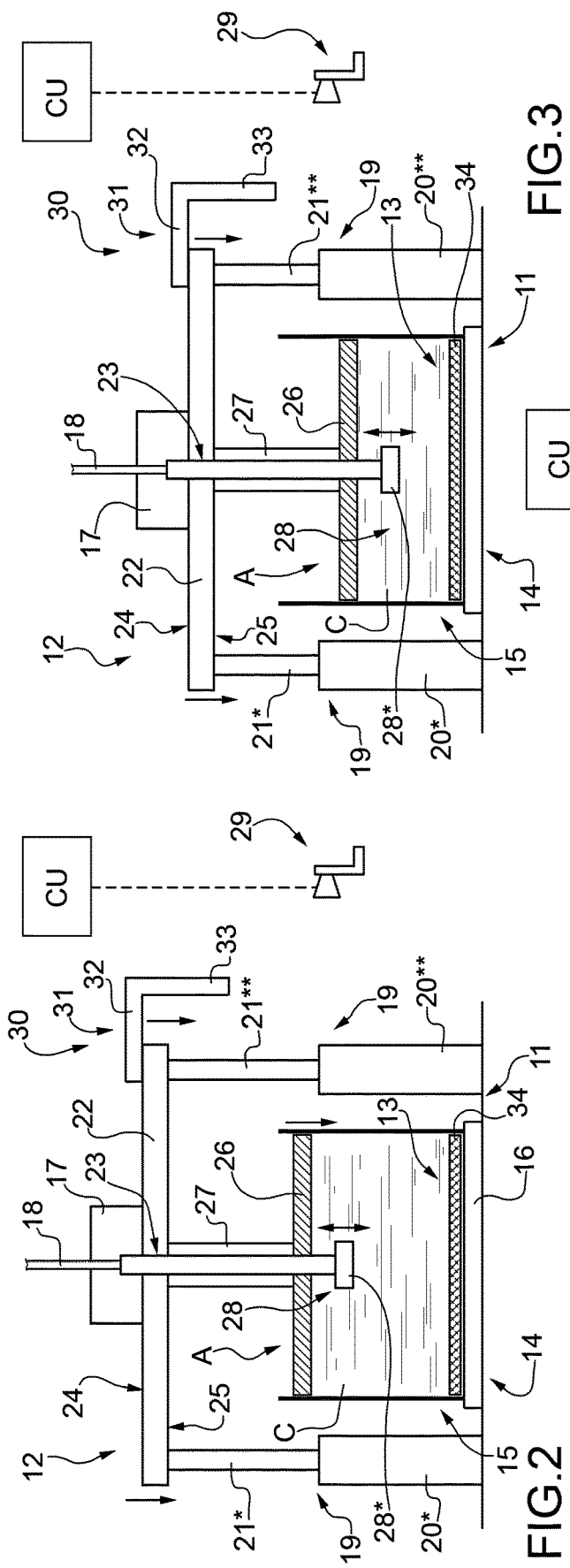
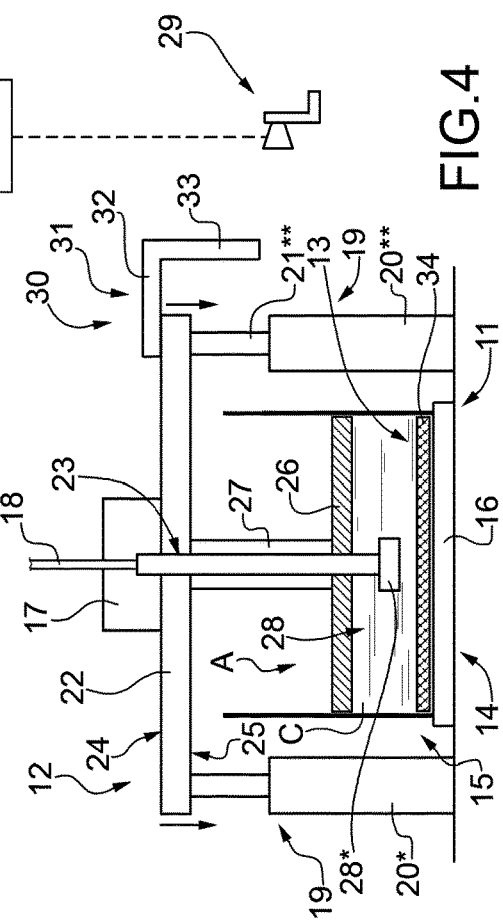
FIG.2
FIG.3
FIG.4

METHOD AND SYSTEM FOR APPLYING A SEALING AGENT TO THE SURFACE OF AN INTERNAL CAVITY OF A PNEUMATIC TIRE

TECHNICAL SECTOR

The present invention relates to a method and a system for applying a sealing agent to the surface of an internal cavity of a pneumatic tire.

PRIOR ART

As is known, a pneumatic tire comprises a toroidal carcass, which has two annular beads and which supports an annular tread. Between the casing and the tread, a tread belt is interposed, which comprises a number of tread plies. An innerliner is arranged within the body ply which is airtight, constitutes an inner lining and has the function of retaining the air within the pneumatic tire in order to maintain, over time, the inflation pressure of the pneumatic tire itself.

In recent years pneumatic tire development has been directed towards pneumatic tires with an inner lining that is manufactured with a sealing agent that is intended to seal any punctures. Typically, the sealing agent has a high viscosity in order to ensure both the sealing action in relation to any holes and the stability thereof within the internal cavity regardless of the conditions of the pneumatic tire.

The sealing agent is applied to a pre-vulcanized pneumatic tire and preferably to the innerliner within the area of the pneumatic tire that comes into contact with the road (or the area of the pneumatic tire wherein punctures can potentially occur). In particular, the sealing agent is applied at the tread and at least partially at the sidewalls.

Typically, the process for applying the sealing agent provides for the positioning of the pre-vulcanized pneumatic tire on a frame, whereupon it is blocked by means of lateral rails in such a way as to prevent any lateral translation of the pneumatic tire itself.

In response to an operator command, the sealing agent application process is started by inserting a sealing agent applicator device into the internal cavity of the pneumatic tire in a position directly facing a surface of the internal cavity itself. The applicator device is conveniently implemented by means of a movable arm provided at one end of a nozzle and is intended to apply a substantially uniform bead of sealing agent to the inner surface of the cavity. In particular, the applicator device is intended to apply a bead of sealing agent by means of a reciprocating movement between the two lateral ends of the internal cavity; in particular, the arm moves within a plane that is perpendicular to the equatorial plane of the pneumatic tire. The pneumatic tire is brought into rotation by the support by means of motorized rollers; and the movement of the arm and the rotation of the pneumatic tire leads to the application of the sealing agent, which must be as uniform as possible.

The applicator device is connected to a circuit supplying the sealing agent comprising a tank, preferably manufactured from a metallic material and containing the sealing agent, a conduit that is preferably heated and that originates from the tank and that is in hydraulic communication with the applicator device, and a pumping device that draws the sealing agent from the tank and feeds it under pressure to the applicator device.

The extraction of the sealing agent from the tank can, however, be particularly complex due to the high viscosity thereof. In particular, when the amount of sealing agent contained within the tank reduces, it may be difficult for the sealing agent itself to flow from the side wall of the tank towards the extraction point, this also leading to cavitation phenomena in relation to the pumping device.

DESCRIPTION OF THE INVENTION

The object of the present invention is therefore to provide a method for applying a sealing agent to the surface of an internal cavity of a pneumatic tire that is free from the disadvantages of the state of the art and that is, in particular, easy and inexpensive to implement.

A further object of the present invention is therefore to provide a system for applying a sealing agent to the surface of an internal cavity of a pneumatic tire that is free from the disadvantages of the state of the art and that is, in particular, easy and inexpensive to manufacture.

According to the present invention a method and a system are provided for applying a sealing agent to the surface of an internal cavity of a pneumatic tire according to what is determined within the attached claims.

BRIEF DESCRIPTION OF THE DRAWINGS

The present invention is now described with reference to the attached drawings, which illustrate several non-limiting exemplary embodiments, wherein:

FIGS. 2 to 4 are schematic views associated with various operating configurations of a detail of FIG. 1.

PREFERRED EMBODIMENTS OF THE INVENTION

Figure 1:
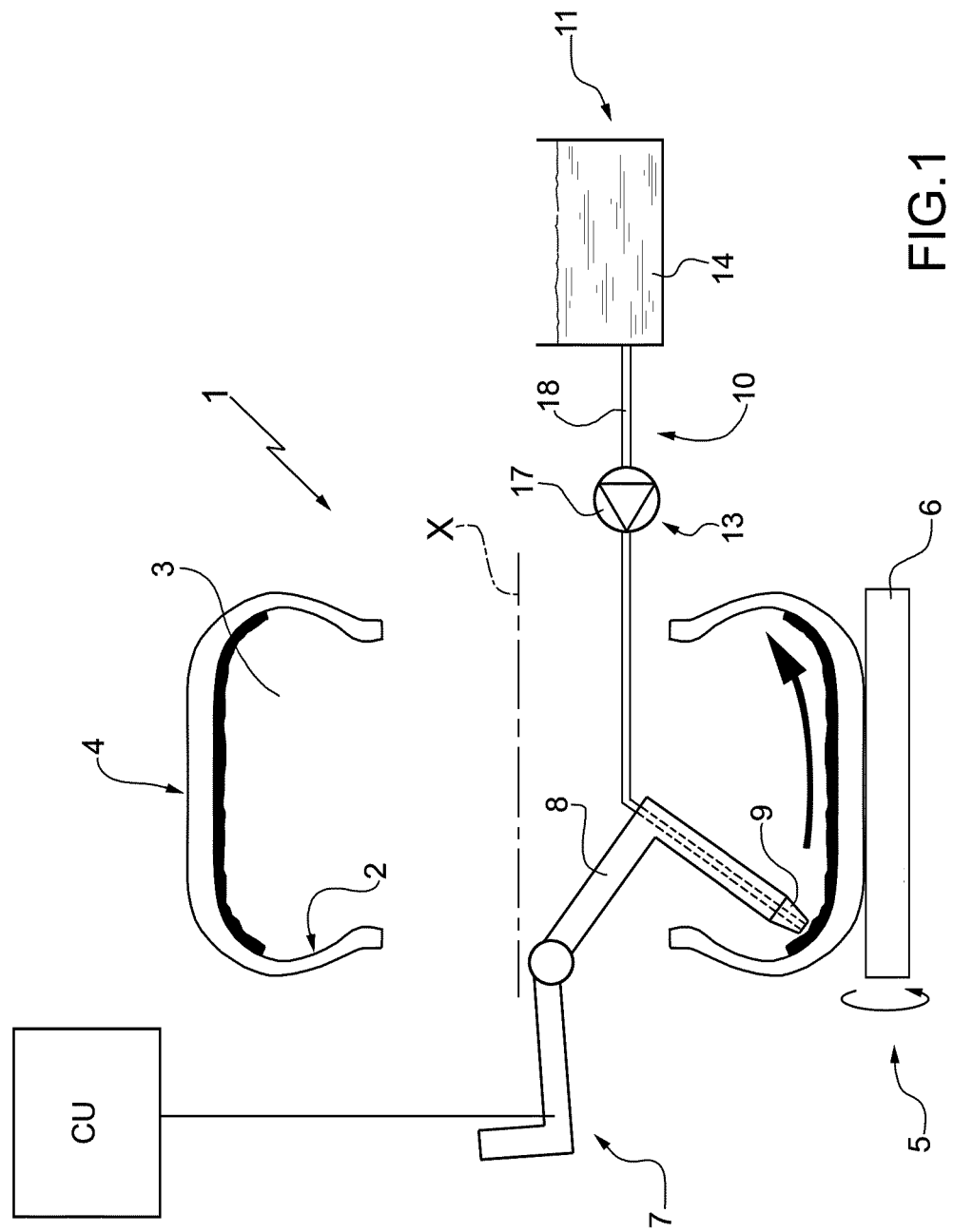
FIG. 1 is a front schematic view, with parts removed for clarity, of a system that has been implemented for the application of a sealing agent to the surface of the internal cavity of a pneumatic tire.

With reference to FIG. 1, the numeral 1 denotes a system 1 in its entirety configured for the application of a sealing agent to the surface 2 of the inner cavity 3 of a pneumatic tire 4. It is to be understood that the phrase "profile of the internal cavity 3 of a pneumatic tire 4", refers to a surface profile of the pneumatic tire 4.

The pneumatic tire 4 is arranged on a frame 5 that is suitable for supporting, and bringing into rotation about the x axis thereof, the pneumatic tire 4 by means of motorized rollers 6. The system 1 comprises a sealing agent applicator device 7 conveniently implemented by means of a robot provided with a movable arm 8 and intended to apply a substantially uniform bead of sealing agent to the surface 2 at the portion of the pneumatic tire 3 that is intended to come into contact with the road, i.e., at the tread and, at least partially, at the sidewalls. According to a preferred variant, in order to perform the non-contact application of the sealing agent in the semifluid state, the applicator device 7 is implemented by means of a nozzle 9; the nozzle 9 is preferably arranged at one axial end of the movable arm 8.

A sealing agent supply circuit 10 is connected to the applicator device 7. The system 1 also comprises a control unit CU that supervises the operation of the applicator device 7 and/or the supply circuit 10, as better described within the discussion that follows.

As illustrated in FIGS. 2 to 4, the supply circuit 10 comprises a sealing agent collection device 11, a sealing agent heating device 12 and a sealing agent supply device 13.

The sealing agent collection device 11 comprises a collection tank 14, preferably made of a metallic material and in particular of steel, that collects the sealing agent therewithin.

The tank 14 is defined by a cylindrical tubular casing 15 that is closed at the bottom by a bottom wall 16 and open at the top (i.e., it is not provided with an upper wall or lid). The tank 14 has a variable volume collection chamber C, having a cylindrical symmetry about an axis of rotation and is laterally delimited by the casing 15.

In contrast, the sealing agent supply device 13 comprises a pumping device 17 connected to the control unit CU by which it is actuated and that is suitable for withdrawing the sealing agent from the tank 14 and supplying it, under pressure, to the applicator device 7 by means of a sealing agent supply conduit 18. The sealing agent supply conduit 18 is preferably heated, it originates from the tank 14 and is in hydraulic communication with the applicator device 7. According to a preferred variant, a number of shut-off valves (not shown) that control and regulate the flow of sealing agent along the supply conduit 18 downstream of the pumping device 17 are also located.

The pumping device 17 is preferably implemented by means of an extraction pump (known per se and not described in detail), in particular of the pneumatic type and specifically for highly viscous materials.

As illustrated in FIGS. 2 to 4, the sealing agent supply device 13 then comprises a pair of extractor devices 19 arranged externally to the tank 14. In particular, the two extractor devices 19 are implemented by means of a pair of hydraulic extractor cylinders 19 arranged laterally in relation to the tank 14. The two extractor cylinders 19 are diametrically opposite in relation to the tank 14. The two extractor cylinders 19 are of a known type and are provided with a respective cylinder 20*, 20** comprising a hollow cylindrical body, a movable piston (not shown) that slides within the cylinder 20*, 20** due to the effect of the pressure exerted by the fluid contained within the cylinder 20*, 20** itself and a rod 21*, 21** having a first end connected to the piston and a second, outer end connected to the cylinder 20*, 20**. In particular, the rods 21*, 21**, are connected at a second end to a thrust plate 22. The thrust plate 22 is provided with a through-hole 23 formed at a substantially central position. At an upper surface 24 (i.e., facing externally and not facing the collection device 11), the thrust plate 22 carries, connected at a substantially central position, the pumping device 17. At an inner surface 25 (i.e., in a position directly facing the collection device 11), the thrust plate 22 carries, connected at a substantially central position, an assembly A formed by a piston 26 that axially delimits the collection chamber C and a rod 27 connecting the piston 26 and the thrust plate 22.

In particular, the thrust plate 22 and the assembly A can move downwards (in other words towards the bottom wall 16) in such a way as to exert a substantially constant pressure against the sealing agent as the amount of sealing agent within the tank 14 varies.

In use, the thrust plate 22 and the assembly A are movable between an upper end-of-travel position (shown in FIG. 2), in which the volume of the collection chamber C is at a maximum, and a lower end-of-travel position (shown in FIG. 4), which substantially corresponds to the complete emptying of the tank 14, wherein the volume of the collection chamber C is at a minimum and the piston 26 is arranged substantially at the bottom wall 16.

Both the piston 26 and the rod 27 are made internally hollow, i.e., they are provided with respective through holes that are arranged, when in use, facing each other and in communication with each other in such a way as to define a channel for the passage of an extractor element 28.

In addition, the opening formed in the rod 27 is facing, and in communication with, the through-hole 23.

The extractor element 28 is provided at one end with a movable scoop 28* intended to move with a reciprocating motion in such a way as to withdraw the sealing agent within the collection chamber C in the vicinity of the piston 26 and to supply said sealing agent to the pumping device 17.

In addition, the supply circuit 10 comprises a level sensor 29 intended to detect the amount of sealing agent contained within the tank 14. The level sensor 19 is preferably arranged externally to the tank 14 and to the pair of extractor cylinders 19. The level sensor 29 is connected to the control unit CU, whereto it transmits signals that are indicative of the amount of sealing agent contained within the tank 14. Depending upon the amount of sealing agent contained within the tank 14 and detected by the level sensor 29, the control unit CU is intended both to prevent excessive sealing agent from being supplied (which may overflow from the tank 14) and to actuate the sealing agent heating device 12 and the sealing heating supply device 13.

The thrust plate 22 is also provided with a piston 26 position control device 30 that is preferably arranged externally to the tank 14.

According to a preferred variant, said control device 30 is preferably implemented by means of a bracket 31, preferably L-shaped. The bracket 31 comprises a stub 32 that extends laterally from the thrust plate 22 and a stub 33 that extends downwards (i.e., it faces the bottom wall 16) from the free end of the stub 32 and that is substantially orthogonal to the stub 32.

The level sensor 29 is intended to determine/recognize a beginning of depletion position (shown in FIG. 3), defined as being when the passage of a free end of the stub 33 is detected, and a completely empty position (shown in FIG. 4), defined, in contrast, as being when the passage of the free end of the stub 33 connected to the stub 32 is detected, which coincides with the lower end-of-travel position introduced previously.

The heating device 12 is located at the bottom wall 16 and is provided with a heating element 34 for heating the sealing agent.

According to a first variant, the heating element 34 is implemented by means of an electrical resistance connected to the control unit CU, whereby it is switched. The electrical resistance, in order to heat the sealing agent, is preferably embedded within a disc element of reduced thickness. According to a further variant, the heating element 34 is implemented by means of a conduit or a coil wherein a heating fluid circulates that is supplied by a supply circuit. The control unit CU, by means of the heating element 29, is intended to maintain the temperature of the sealing agent at a reference value. Said reference value is between 75° C. and 85° C.; preferably, said reference value is equal to 80° C.

When the level sensor 29 recognizes the beginning of depletion position (i.e., when it detects the free end of the stub 33), the control unit CU is intended to actuate the pumping device 17 in such a way as to allow the sealing agent to flow from the side wall of the casing 15 towards a central position of the bottom wall 16, such as to be withdrawn by the scoop 28* until reaching the completely empty position.

In more detail, until reaching the beginning of depletion position (i.e., when the free end of the stub 33 is detected), the CU control unit is intended to actuate the pumping device 17 in such a way that the scoop 28\* performs one sealing agent extraction per second.

For example, according to a first and preferred variant, once it reaches the beginning of depletion position (i.e., when the passage of the free end of the stub 33 is detected by the level sensor 29) and until reaching the completely empty position, the control unit CU is intended to actuate the pumping device 17 as follows:

- perform a number n of extraction cycles (for example, twenty extraction cycles) of the extractor element 28 (at a constant rate of one sealing agent extraction per second);
- wait for a stop interval $T_{STOP\_1}$, equal, for example, to thirty seconds;
- perform n extraction cycles of the extractor element 28 (at a constant rate of one sealing agent extraction per second);
- wait for a stop interval $T_{STOP\_2}$ that is longer than the stop interval $T_{STOP\_1}$ and equal, for example, to forty seconds;
- perform n extraction cycles of the extractor element 28 (at a constant rate of one sealing agent extraction per second));
- wait for a stop interval $T_{STOP\_3}$ that is longer than the stop interval $T_{STOP\_2}$ and equal, for example, to fifty seconds;
- and so on, repeating sequences with the same number n of extraction cycles of the extractor element 28 at a constant rate and arranging stop intervals $T_{STOP\_n}$ of increasing length between one sequence and the next.

In other words, the stop interval $T_{STOP\_n}$ that elapses between two successive sequences of pumping device 17 activations gradually increases in order to give the sealing agent the amount of time necessary in to flow towards the central position of the bottom wall 16. In further words, the stop interval $T_{STOP\_n}$ that elapses between two successive sequences of pumping device 17 activations is inversely proportional to the residual quantity of sealing agent contained within the collection chamber C.

As an alternative, according to a further variant, once the beginning of depletion position is reached (i.e., when the passage of the free end of the stub 33 is determined by the level sensor 29) and until reaching the completely empty position, the control unit CU is arranged to actuate the pumping device 17 in such a way as to repeat sequences with the same number n of extraction cycles of the extractor element 28 at a constant rate (during the same sequence), gradually decreasing between one sequence and the next, and arranging stop intervals $T_{STOP}$ of a constant duration between one sequence and the next.

Alternatively, according to a further variant, once the beginning of depletion position is reached (i.e., when the passage of the free end of the stub 33 is detected by the level sensor 29) and until reaching the completely empty position, the control unit CU is arranged to control the pumping device 17 in such a way as to repeat sequences with the same number n of extraction cycles of the extractor element 28 at a constant rate (during the same sequence) and gradually decreasing between one sequence and the next, and arranging stop intervals $T_{STOP\_n}$ of increasing duration between one sequence and the next.

Furthermore, when the level sensor 29 recognizes the beginning of depletion position (i.e., when it detects the free end of the stub 33), the control unit CU is arranged in order to increase the temperature of the sealing agent by means of the heating element 34 in such a way as to optimize the flow of the sealing agent from the side wall of the casing 15 towards a central position and to then be withdrawn by the scoop 28\* until reaching the completely empty position.

In particular, when the level sensor 29 recognizes the beginning of depletion position i.e., when the free end of the stub 33 is detected), the control unit CU is arranged in such a way as to increase, in a progressive manner, the sealing agent reference temperature by means of the heating element 34 until reaching the completely empty position. In other words, the sealing agent reference temperature is gradually increased by means of the heating element 34 in order to allow the sealing agent to flow from the side wall of the casing 15 towards the central position. Said reference value is increased up to a maximum value of between 90° C. and 95° C.; preferably, said reference value is increased up to 92° C.

In further words, the sealing agent reference temperature, by means of the heating element 34, is inversely proportional to the amount of sealing agent contained within the collection chamber C.

Hereinafter, the method of operation of the system 1 is described and includes, in succession, the following steps:

- a commercial tank 14 of sealing agent is produced, transferred to the place of manufacture of pneumatic tires 4 where the application of the sealing agent takes place, and where it is fitted with the heating device 12 for and the supply device 13;
- an operator or alternatively an automatic manipulator arranges the pneumatic tire 4 on the frame 5 and blocks it by means of side rails in such a way as to prevent any lateral translation of the pneumatic tire 4 itself;
- the applicator device 7 is inserted into the internal cavity 3;
- the nozzle 9 is moved to an initial position in order to start the application of the sealing agent;
- the pneumatic tire 4 is brought into rotation about the X axis by the frame, whilst the nozzle 9 begins the application of the sealing agent;
- during the application of the sealing agent, the amount of sealing agent within the collection chamber C is constantly monitored by means of the level sensor 19;
- when the level sensor 19 recognizes the beginning of depletion position, the control unit CU is arranged to control the pumping device 17 according to one of the methods described previously and/or in order to increase the temperature of the sealing agent by means of the heating element 34 in order to optimize the flow of the sealing agent until reaching the completely empty position;
- upon reaching the completely empty position, the frame 5 is stopped such that the applicator device 7 can be removed from the inner cavity 3 and the pneumatic tire 4 can be extracted from the frame 5.

The advantages of the system 1 described in the preceding discussion are evident. In particular, the system 1 makes it possible to optimize the flow of the sealing agent towards the central position of the bottom wall 16, it makes it possible to simplify the extraction of the sealing agent from the tank 14 and, in this way, to prevent damage to the pumping device 17 and to allow for the complete emptying of the tank 14.

The invention claimed is:

1. A system for applying a sealing agent to an inner surface of a cavity of a pneumatic tire, the system comprising:
    an applicator device configured to apply the sealing agent to the inner surface and to move itself into and out of the inner cavity;

a sealing agent supply circuit connected to the applicator device and comprising:
  a tank defined by a casing having a variable volume collection chamber;
  a heating element actuatable to maintain a temperature of the sealing agent at a reference value;
  a pumping device that supplies the sealing agent to the applicator device;
  a movable piston which axially delimits the collection chamber;
  an extractor element configured to move with a reciprocating motion to draw the sealing agent into the collection chamber and to supply the sealing agent to the pumping device;
  a level sensor configured to determine positions of a piston position control device relative thereto and corresponding to an amount of sealing agent contained within the tank, said positions comprising a beginning of depletion position of the tank and a completely empty position of the tank; and
  a control unit configured to control the extractor element and/or the heating element as a function of said positions, wherein once the beginning of depletion position has been reached, the control unit is configured to direct the extractor element according to sequences having a number of extraction cycles, and further one or more of:
    imposing stop intervals that increase a duration between one sequence and the next; and/or
    gradually decreasing the number of extraction cycles of the extractor element between one sequence and the next.

2. The system of claim 1, wherein the piston position control device comprises a bracket, wherein passage of a first end of the bracket at the position of the level sensor determines the beginning of depletion position of the tank and passage of a second end of the bracket at the position of the level sensor determines the completely empty position of the tank.

3. The system of claim 2, wherein the bracket is L-shaped.

4. The system of claim 1, wherein the heating element is implemented via an electrical resistance.

5. The system of claim 4, wherein the electrical resistance is embedded within a disc element arranged in proximity to a bottom wall of the tank.

6. The system of claim 1, comprising a thrust plate supporting an assembly formed by the piston and by a rod connecting the piston and the thrust plate; wherein, when in use, the thrust plate and said assembly are movable between an upper end-of-travel position wherein the volume of the collection chamber is at a maximum, and a lower end-of-travel position, which substantially corresponds to the complete emptying of the tank, wherein the volume of the collection chamber is at a minimum.

7. The system of claim 6, wherein the thrust plate and said assembly are internally hollow, such that respective through holes are in communication to define a channel for passage of an extractor element.

8. The system of claim 6, wherein the piston position control device is connected to the thrust plate.

9. The system of claim 6, comprising a pair of extractor devices arranged externally to the tank and configured for actuation of the thrust plate and of said assembly.

10. The system of claim 9, wherein the pair of extractor devices comprise a pair of hydraulic extractor cylinders.

* * * * *